Patented Apr. 7, 1925.

1,532,691

UNITED STATES PATENT OFFICE.

EDWARD L. FORD, OF YOUNGSTOWN, OHIO.

MANUFACTURE OF PUDDLED IRON.

No Drawing.    Application filed April 9, 1923.   Serial No. 630,943.

*To all whom it may concern:*

Be it known that I, EDWARD L. FORD, a citizen of the United States, residing at Youngstown, Mahoning County, Ohio, have invented a new and useful Improvement in the Manufacture of Puddled Iron, of which the following is a full, clear, and exact description.

My invention relates to the manufacture of puddled iron, and is designed to increase the percentage of iron recovered in the puddle ball, and thereby decrease the cost of puddled iron.

The invention relates to the addition of oxides to provide oxygen for removing carbon and metalloids in the puddled iron, and it consists, generally, in artificially reducing the amount of oxygen in the oxide addition to near or about the theoretical content of oxygen desired, independent of the amount of reagents used.

In making puddled iron, the pig iron must come in contact with sufficient oxygen to reduce the carbon and contained metalloids to the desired point at a temperature sufficiently high so that the reaction will take place. This oxygen is supplied by the reagents present (oxides of iron) and by the oxygen in the flame or atmosphere of the furnace. It is of advantage to supply as much of this oxygen as possible from the oxides added, rather than from the flame or atmosphere, since as the oxygen is removed from the oxides, they are reduced to metallic iron, thus increasing the yield of puddled iron. Hence, the smaller the percentage of oxygen in the reagents, so long as they are sufficient to perform the desired function, the greater the amount of oxides necessary, and hence the greater the amount of metallic iron produced, so long as the temperature of the pig iron and that of the reagents is high enough to react. In order to accomplish this desirable result, I propose to artificially reduce the amount of oxygen in the oxide reagents added to the bath to as low a percentage as is economically desirable. The percentage of oxygen in these reagents may be artificially reduced in any one of several ways as follows:

1. The oxides used, whether natural oxides, such as ores, or oxides produced as a byproduct from manufacturing processes (such as scales, cinder, etc.) may be treated to partially reduce the oxygen present therein, before adding to the puddle bath. A simple way of carrying out this step is that of passing hot blast furnace gas or hot producer gas over the oxides to partially reduce them, or treating them with powdered coal at a reactive temperature.

2. Finely divided metallic iron or steel (such as borings and turnings) may be partly oxidized and used for this purpose. This may be easily carried out by roasting them with an oxidizing flame in any convenient type of furnace.

3. Any combination of the artificially treated oxides of (1) and (2) may be used which will give the least amount of oxygen for the largest amount of iron which can be produced economically in the reaction.

4. The amount of oxygen contained in the additions may be reduced by mixing untreated oxides of iron with untreated borings and turnings to reduce the oxygen content of the whole.

5. The oxides, whether natural or partly artificially treated, as above, may be combined with finely divided carbon, such as coal, charcoal, etc., in the proper proportions to give the desired amount of oxygen in the combined amount for the reagent material.

It will be noted that in all these cases, the amount of oxygen is artificially reduced in the total reagents added either by artificial reducing of oxides or artificial oxidizing of finely divided metals, or by adding carbon, which will react with the iron oxide when added to the puddle bath to reduce the oxygen content of the oxide or by combinations of these; and by the words "having an artificially reduced oxygen content" in my claims, I intend to cover any of these different methods.

These reagents are added to the puddling bath either at the special stage set forth in my copending application, Serial No. 441,507, filed January 31, 1921, that is, near the end of the first period of removing silicon and phosphorus and at or near the beginning of the boiling period; or they may be added at the ordinary time of making such additions. In the broader claims, I do not wish to be limited to any specific time of adding to the bath used in the making of puddled iron.

It will, of course, be understood that it is impossible to completely prevent the free oxygen of the bath atmosphere from performing part of the work, either in directly oxidizing the carbon and metalloids of the puddling bath or in raising the added reagents somewhat in oxygen content; but as much as possible of the oxygen should be supplied from the added reagents in which, according to my invention, the oxygen content is artificially reduced.

It will usually be cheaper to reduce the amount of oxygen in the oxides than to partly oxidize finely divided iron or steel on account of the added cost of the latter in the market.

The advantages of my invention will be apparent to those skilled in the art, since by artificially reducing the oxygen in the additions, a larger theoretical amount of oxide is required, and therefore, the amount of puddle ball produced is increased at low cost.

Changes may be made in the reagents used, the method of preparing them, the time of addition, etc., without departing from my invention.

I claim:

1. In the manufacture of puddled iron, the step consisting of adding to the puddle bath an oxide of iron reagent having an artificially reduced oxygen content.

2. In the manufacture of puddled iron, the step consisting of adding to the puddle bath a reagent mixture containing iron oxides having an artificially reduced oxygen content.

3. In the making of puddled iron, the steps consisting of cooling down the puddle bath and granulating the metal by adding reagents containing an iron oxide having an artificially reduced oxygen content at or before the beginning of the boiling period and removing the carbon from the iron while in granular form.

4. In the manufacture of puddled iron, the step consisting of adding in the puddling operation a reagent mixture containing iron oxide, having an artificially reduced oxygen content.

5. In the manufacture of puddled iron, the step consisting of artificially reducing the oxygen content of an oxide of iron reagent added to the puddle bath to oxidize contained carbon and metalloids.

In testimony whereof I have hereunto set my hand.

EDWARD L. FORD.